J. A. & L. HILDUM.
SELF HEATING DINNER PAIL.
APPLICATION FILED APR. 18, 1913.
1,090,056.
Patented Mar. 10, 1914.
2 SHEETS—SHEET 2.
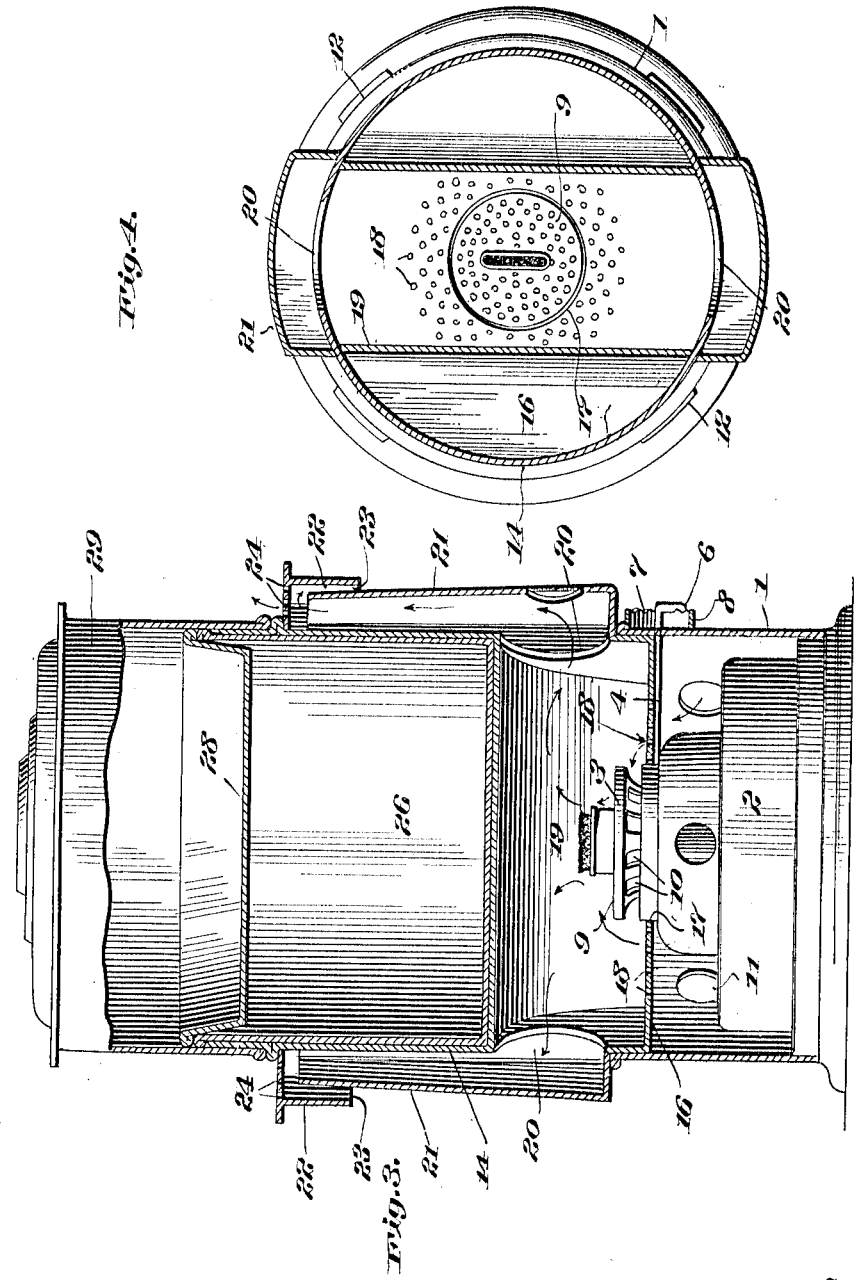
Witnesses
G. C. Hennesy
J. W. Warner
Inventors
James A. Hildum and
Leonard Hildum,
By Victor J. Evans
Attorney

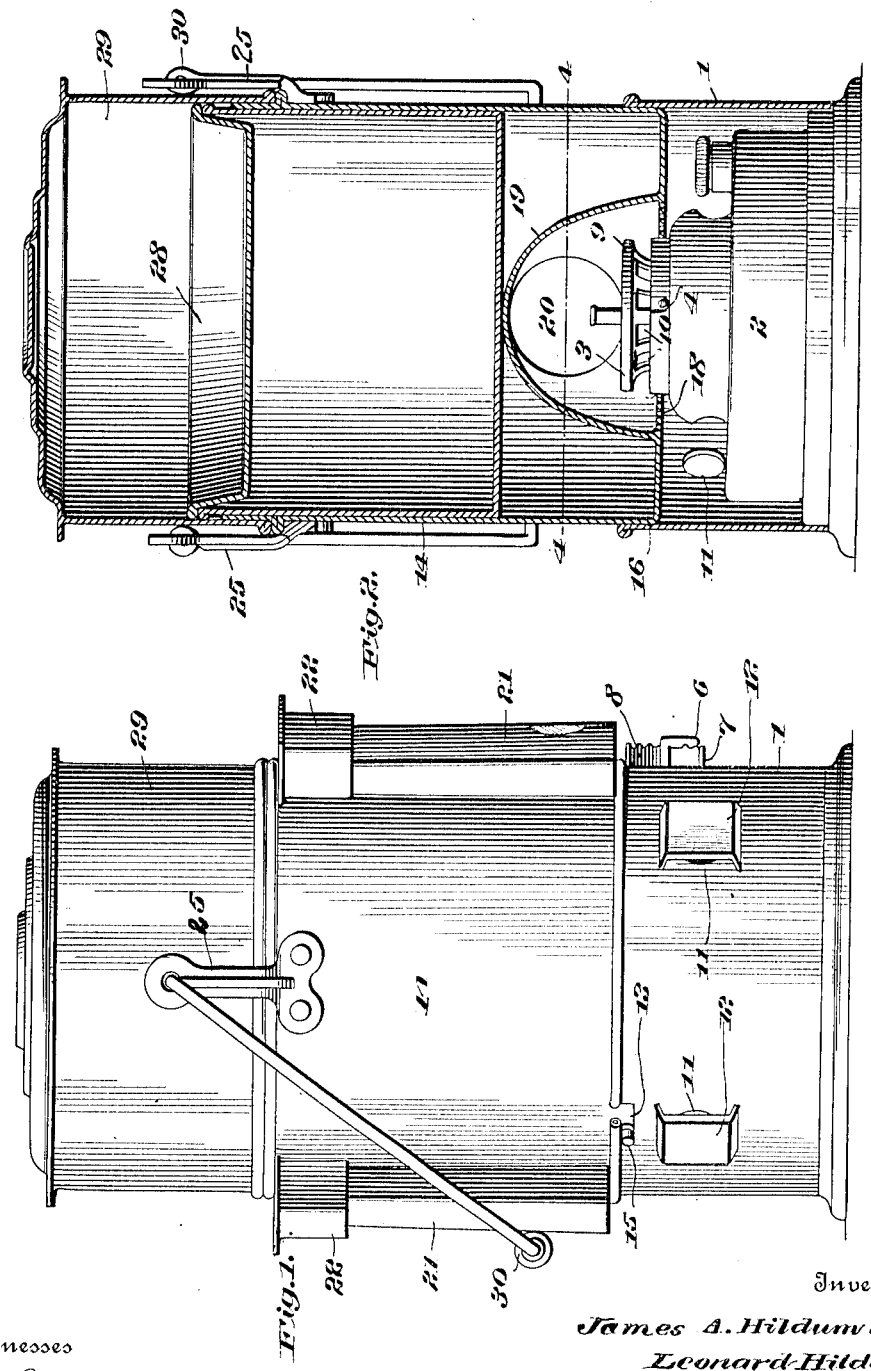

UNITED STATES PATENT OFFICE.

JAMES A. HILDUM AND LEONARD HILDUM, OF OOLITIC, INDIANA.

SELF-HEATING DINNER-PAIL.

1,090,056. Specification of Letters Patent. Patented Mar. 10, 1914.

Application filed April 18, 1913. Serial No. 762,089.

*To all whom it may concern:*

Be it known that we, JAMES A. HILDUM and LEONARD HILDUM, citizens of the United States, residing at Oolitic, in the county of Lawrence and State of Indiana, have invented new and useful Improvements in Self-Heating Dinner-Pails, of which the following is a specification.

This invention is an improved self-heating dinner pail for use by workmen in heating or keeping their dinners warm and consists in the construction, combination and arrangement of devices hereinafter described and claimed.

The object of this invention is to provide an improved dinner pail provided with heating means such as a lamp and also provided with means for protecting the flame of the lamp, from draft and from being blown out by the wind; a further object being to provide an improved dinner pail of this character which embodies a plurality of vessels for containing different articles of food and all of which can be compactly arranged in the pail for heating at the same time by the lamp.

In the accompanying drawings:—Figure 1 is a side elevation of a self-heating dinner pail constructed in accordance with our invention. Fig. 2 is a vertical central sectional view of the same. Fig. 3 is a similar view on a plane at right angles to that of Fig. 2. Fig. 4 is a horizontal sectional view of the same on the plane indicated by the line 4—4 of Fig. 2.

The base member 1 of our improved self-heating dinner pail is cylindrical in form, closed at its lower end, open at its upper end and is provided with a lamp 2 of suitable construction which is secured therein and on the bottom thereof. This lamp is provided with a burner 3 which has a wick raiser of usual form and provided with a shaft 4. The shaft 4 of the wick raiser extends out through an opening in one side of the base and is provided at its outer end with a crank 6 which may be engaged with any one of a series of serrations 7 on a plate 8 which is secured to and projects radially from the outer side of the base. This plate and crank enable the wick raiser to be secured at any desired adjustment. An annular shield 9 is arranged around and spaced from the base of the burner and is provided at suitable points with openings 10. The base member 1 also has air inlet openings 11 arranged at suitable points out of line with the openings 10 and over each of the said openings 11 is a wind shield 12. A pair of bayonet slots 13 are at the upper side of the base member at diametrically opposite points. The body 14 of the pail is also cylindrical in form and is of such diameter as to enable its lower end to be fitted in the upper portion of the base member 1. The body 14 is provided with radial studs 15 which coact with the bayonet slots 13 of the base member to detachably lock the pail body to the base member.

The bottom 16 of the pail body has a large central opening 17 for the reception of the burner of the lamp and also has perforations 18 at opposite sides of said central opening. A cross flue 19 which is made of sheet metal and is substantially of semi-tubular form, opens at its lower side, is arranged across and secured on the bottom of the pail body and its ends are secured to the walls thereof and communicate with openings 20. Hence, the cross flue also in effect forms a portion of the bottom of the pail, as will be understood. Vertical flues 21 are secured on opposite sides of the pail body, over the openings 20 their lower ends being closed and their upper ends open. These flues also form projections on opposite sides of the body which, when the pail body is secured on the base member bear on the upper edge of the wall of the base member and thus support the weight of the pail and its contents. At the upper end of each flue 21 is a cowl 22 which projects from and is secured to the wall of the pail body each cap or cowl being closed at its upper end and open at its lower side as at 23 and extending downwardly some distance over the upper end of one of the flues. The top of each cap is also provided with perforations 24.

It will be noted that the heated air and products of combustion pass from the burner outwardly in opposite directions through the cross flue 19 and openings 20 into the lower ends of the flues 21 and from the latter up through the caps 22 and around the spaces 23 between the lower overhanging portions of said caps and the upper ends of said flues. Hence, wind is prevented from blowing downwardly in the flues and interfering with the burning of the lamp.

The pail body is also provided with lugs 25 and with a bail 30.

Coffee, tea, soup or other liquid may be placed in the bottom of the pail for heating. An inner pail 26 is also provided which is adapted to fit in the upper portion of the pail 14 and to bear at its bottom on the cross flue. Any desired article or articles of food may be kept in the inner pail and the latter is provided with a cover 28 which forms a pan or plate. Food may also be kept and heated in this cover. An outer cover 29 is provided to fit on the upper end of the pail 14 so as to completely inclose all the contents of the pail 14.

It will be understood that all the parts of our improved self-heating dinner pail may be compactly disposed, that they may be disconnected when desired, and that by lighting the lamp the contents of the pail may be readily and thoroughly heated when desired.

We claim:—

1. The herein described self heating dinner pail comprising a base member, a lamp in the base member, having an upwardly extending burner, a pail having its lower portion detachably secured in the upper portion of the base and provided in its bottom with an opening up through which the lamp burner extends, the pail being further provided with a cross flue on its bottom extending across the pail and open at its ends, the lamp burner being arranged in the said cross flue.

2. The herein described self heating dinner pail comprising a base member, a lamp in the base member, having an upwardly extending burner, a pail having its lower portion detachably secured in the upper portion of the base and provided in its bottom with an opening up through which the lamp burner extends, the pail being further provided with a cross flue on its bottom extending across the pail and open at its ends, the lamp burner being arranged in the said cross flue, said pail being further provided with vertical flues the lower ends of which communicate with said cross flue.

3. The herein described self heating dinner pail comprising a base member, a lamp in the base member, having an upwardly extending burner, a pail having its lower portion detachably secured in the upper portion of the base and provided in its bottom with an opening up through which the lamp burner extends, the pail being further provided with a cross flue on its bottom extending across the pail and open at its ends, the lamp burner being arranged in the said cross flue, said pail being further provided with vertical flues the lower ends of which communicate with said cross flue, said flues projecting from opposite sides of the pail and their lower ends resting on the wall of the base member and supporting the pail.

4. The herein described self heating dinner pail comprising a base member, a heating device in the base member, a pail having its lower portion detachably secured in the upper portion of the base and provided with openings in its bottom and also with a cross flue communicating with said openings and extending across the pail and open at its ends, an inner pail detachably fitted in the pail and arranged to bear upon the said cross flue and a cover for the pail and for the inner pail.

In testimony whereof we affix our signatures in presence of two witnesses.

JAMES A. HILDUM.
LEONARD HILDUM.

Witnesses:
JOHN N. DEFORD,
FERNANDO DEFORD.

Copies of this patent may be obtained for five cents each, by addressing the "Commissioner of Patents, Washington, D. C."